Patented Feb. 25, 1941

2,233,251

UNITED STATES PATENT OFFICE 2,233,251

METHOD OF TREATING YEAST

André Draghi, New York, N. Y.

No Drawing. Application March 18, 1937,
Serial No. 131,644

4 Claims. (Cl. 99—96)

This invention relates to the production of a desiccated, live yeast which possesses the properties of undesiccated yeast, and more particularly to a desiccated yeast which possesses the cell structure, the vitamin content, the enzymes, the ability to cause fermentation and the power of multiplication of undesiccated yeast.

An object of the invention is to provide a yeast product having the above properties which can be easily handled and transported and which can be kept for extended periods of time without change.

Another object is to make an edible yeast product having the above characteristics.

Another object is to make a product of the above type from brewery yeast and the like which originally has a disagreeable taste but which contains certain vitamins and possesses various other desirable food values.

Another object is to provide a process for making a product of the above type.

Other objects and advantages will be apparent as the nature of the invention is more fully disclosed.

The novel features which are believed to be characteristic of this invention will be more particularly pointed out in the claims appended hereto. The invention will be better understood, however, by referring to the following description in which certain preferred embodiments have been set forth in detail for purposes of illustration.

Yeast derived from beer vats as a by-product in the brewing of beer contains certain desirable characteristics which make the same particularly desirable as a food or for the manufacture of food products. For example, beer yeast is high in certain vitamins. In addition, such yeast is available at small cost. It has heretofore not been used commercially to any great extent, however, because of the objectionable taste and color and because it is not in a form suitable for storage or transportation. The present process accordingly is designed particularly for the treatment of yeast from the above source, although it is not limited thereto but certain of the steps therein may be used for the treatment of yeast from various sources and of various types, such as bakers' yeast.

In accordance with one embodiment of the invention, the least is removed from the beer vats in any convenient manner and is treated to remove a large part of the liquid. For example the yeast may be pressed or treated in a centrifuge to form a mass of wet pressed yeast.

If the product is to be used in food this mass is then washed to improve the taste and color with a solution having an alkalinity below that at which the yeast cells would be killed, preferably a solution having a pH value of 8.5 to 9.0. A solution of sodium bicarbonate, sodium triphosphate or sodium hydroxide is suitable for this purpose, although other carbonates or weak alkalies can also be employed.

The washing removes the dark color and improves the taste of the yeast and leaves the same with a light brown or white, clean appearance.

The wash liquid is removed from the cake, either in a filter press or a centrifuge, to form a pressed, semi-dried cake which is suitable for immediate use as yeast and is somewhat similar to the wet yeast commonly used in commerce.

In order to change this yeast into a desiccated, live yeast product which is suitable for shipment or storage it is then desiccated under conditions such that the yeast has not autolyzed or otherwise changed. In one embodiment this is accomplished by first freezing the wet or moist mass at a temperature as near the freezing point as possible, such, for example, as just below 0° C. The frozen mass may, for example, be placed in a receiver which is connected to an evacuated chamber maintained at a temperature lower than that of the frozen mass, such, for example, as a temperature of $-70°$ C. For this purpose the chamber may be immersed in dry ice or may be artificially cooled by other well known means. A temperature differential is thus established between the frozen mass and the chamber, which causes the ice in the mass to sublime. The ice is thus removed from the yeast cake, leaving the yeast completely desiccated and in substantially its original volume, voids in the desiccated cake corresponding to the space previously occupied by the ice.

The cake, while retaining its original volume, is extremely fragile and may be powdered by applying a slight pressure thereto. It may be pressed or broken into cakes and may be transported in this form. The cakes contain live, desiccated yeast which has not autolyzed and which can be again rendered active by immersing the same in a suitable medium. The yeast is odorless and tasteless, the cell structure remains intact and the yeast retains all of its original properties, particularly its vitamins, enzymes, ability to ferment and power of multiplication.

As a further embodiment of the invention, the pressed, frozen yeast may be desiccated by passing the vapors therefrom at reduced pressure through a desiccated agent, such as sulphuric acid or calcium chloride. This desiccating agent removes the moisture and permits the cake to be desiccated by sublimation in a manner analogous to that outlined above. In this event a temperature differential is not required; hence the sulphuric acid or calcium chloride may be kept at room temperature, although the process is hastened if a high temperature differential is maintained as above described.

In another embodiment of the invention the washed yeast may be separated from the wash solution by a filter press or centrifuge as above described and may be desiccated by making a suspension of the yeast in a suitable reagent such as acetone which does not kill the yeast. An amount of acetone corresponding to from four to five times the weight of the wet pressed yeast may be used. The yeast is then separated from the acetone by filtration or by a centrifuge and the drying may be completed by evaporation, preferably while subjecting the mass to a current of cold air while spread in a thin layer. During this operation the liquid should be stirred or agitated vigorously to maintain the yeast in the form of a suspension of finely divided particles therein.

The acetone is maintained at a temperature below about 50° F. and preferably at a temperature of about 40° F. during the entire treatment. If the temperature is allowed to rise appreciably above these limits the yeast will be killed. A lower temperature may be used, if desired, although the cost is usually decreased by using as high a temperature as possible without killing the yeast.

Both the washing and the desiccation are more efficiently carried out if the yeast is maintained in a fine condition. When the acetone is completely removed the product is in the form of a dry, fine powder consisting of desiccated, live yeast having the various properties enumerated above.

If a product is desired similar to that above described but in which the yeast is not alive, the acetone may be replaced by another desiccating agent such as alcohol, the treatment otherwise being unchanged. This treatment improves the taste and color and leaves the vitamins in an active form but kills the yeast. It may be suitable for food and as a source of certain vitamins.

In certain instances, such for example, as when the yeast is obtained from a source in which the color and taste is satisfactory or if the product is not to be used as food, the step of washing the yeast may be omitted. In that event the product will have the properties above mentioned except for the color and taste which are much improved by the acetone treatment but not as satisfactory as that of the product washed with alkali prior to the acetone treatment.

Although certain specific embodiments of the invention have been set forth in detail, it is to be understood that the invention is not to be limited thereto, but that various changes and modifications may be made therein as will be apparent to a person skilled in the art. The invention is only to be limited in accordance with the following claims when interpreted in view of the prior art.

What is claimed is:

1. The method of treating yeast which comprises making a suspension of the yeast in acetone and then removing the acetone, while maintaining a temperature below 50° F. during the entire treatment, so as to form a desiccated live yeast product having an improved flavor and taste.

2. The process according to claim 1 in which the acetone is removed by filtration followed by evaporation to complete the removal.

3. The process according to claim 1 in which the temperature is maintained at about 40° F. during the entire treatment.

4. The process according to claim 1 in which the acetone is removed by centrifuging followed by evaporation to complete the removal.

ANDRÉ DRAGHI.